(12) United States Patent
Coffey et al.

(10) Patent No.: US 6,709,551 B2
(45) Date of Patent: Mar. 23, 2004

(54) HIGH MOLECULAR WEIGHT CATIONIC AND ANIONIC POLYMERS COMPRISING ZWITTERIONIC MONOMERS

(75) Inventors: Martin J. Coffey, Portage, MI (US); Steven T. Govoni, Joliet, IL (US); Arthur J. Begala, Naperville, IL (US); Ross T. Gray, Plainfield, IL (US); Patrick G. Murray, Yorkville, IL (US)

(73) Assignee: Ondeo Nalco Company, Nsperville, IL (US)

( * ) Notice: Subject to any disclaimer, the term of this patent is extended or adjusted under 35 U.S.C. 154(b) by 69 days.

(21) Appl. No.: 10/023,370

(22) Filed: Dec. 17, 2001

(65) Prior Publication Data

US 2003/0155091 A1 Aug. 21, 2003

(51) Int. Cl.$^7$ .............................................. D21H 21/10
(52) U.S. Cl. ............................. 162/168.1; 162/168.2; 162/168.3; 524/140; 524/141; 524/145; 524/386; 524/460; 526/258
(58) Field of Search ........................... 162/168.2, 168.1, 162/168.3; 526/258; 524/141, 140, 145, 386, 460

(56) References Cited

U.S. PATENT DOCUMENTS

| | | |
|---|---|---|
| 3,269,991 A | 8/1966 | La Combe |
| 3,278,501 A | 10/1966 | Bailey et al. |
| 4,330,450 A | 5/1982 | Lipowski et al. |
| 4,363,886 A | 12/1982 | Lipowski et al. |
| 4,392,917 A | 7/1983 | Lipowski et al. |
| 4,822,847 A | 4/1989 | Schulz et al. |
| 5,240,982 A | 8/1993 | Farwaha et al. |
| 5,788,866 A | 8/1998 | Fong et al. |
| 5,846,558 A | 12/1998 | Nielsen et al. |
| 5,912,294 A | 6/1999 | Schade |
| 6,150,432 A | 11/2000 | Jones et al. |
| 6,313,246 B1 | 11/2001 | Carter et al. |

OTHER PUBLICATIONS

"A New Type of Polyampholyte: Poly(4–vinyl Pyridine Betaine)," Journal of Polymer Science, vol. 26, Iss. 113, pp. 251–254. (1957).

Cardoso, J., et al. "Polymeric Flocculants of the Zwitterionic Type," Polymer Pref., pp. 323–324. (1991).

Ishihara, K., et al., "Preparation of Phospholipid Polymers and Their Properties as Poylmer Hydrogel Membranes," Polymer Journal, vol. 22, No. 5, pp. 355–360. (1990).

McCormick, Charles, "Water soluble copolymers: 46. Hydrophilic sulphobetaine copolymers of acrylamide and 3–(2–acrylamido–2–methylpropanedimethyl–ammonio)–1–propanesultphonate," Polymer, vol. 33, No. 21, p. 4617. (1992).

Orta de Velasquez, M. T., et al, "New Polymeric Coagulants Tested in Water and Wastewater," Environmental Technology, vol. 19, pp. 323–330. (1998).

Salamone, J.C., "Preparation of inner salt polymers from vinylimidazolium sulphobetaines," Polymer, vol. 18, p. 1058. (1977).

Salamone, J.C., "Aqueous solution properties of a poly(vinyl imidazolium sulphobetaine)," Polymer, vol. 19, p. 1157. (1978).

Wang, Yanfeng, "Syntheses and Properties of a Series of Amphiphilic Polyacrylamides Bearing Two Long Alkyl Chains and Phosphatidylcholine Analagous Groups in the Side Chains," Journal of Polymer Science, vol. 34, pp. 449–460. (1996).

"Polyampholites," Encyclopedia of Polymer Science and Engineering, vol. 11, pp. 514–530, J.C. Salamone and W.C. Rice (1994).

*Primary Examiner*—Peter Chin
(74) *Attorney, Agent, or Firm*—Michael B. Martin; Thomas M. Breininger

(57) ABSTRACT

This invention is directed to high molecular weight water-soluble polymers comprised of zwitterionic, nonionic and cationic or anionic monomer units, and to the use of these polymers in papermaking processes.

20 Claims, No Drawings

HIGH MOLECULAR WEIGHT CATIONIC AND ANIONIC POLYMERS COMPRISING ZWITTERIONIC MONOMERS

TECHNICAL FIELD

This invention is directed to high molecular weight water-soluble polymers derived from zwitterionic monomer units, nonionic monomer units and at least one cationic or anionic monomer unit, and to the use of the polymers in papermaking processes.

BACKGROUND OF THE INVENTION

In the manufacture of paper, an aqueous cellulosic suspension or slurry is formed into a paper sheet. The cellulosic slurry is generally diluted to a consistency (percent dry weight of solids in the slurry) of less than 1 percent, and often below 0.5 percent, ahead of the paper machine, while the finished sheet must have less than 6 weight percent water. Hence, the dewatering aspects of papermaking are extremely important to the efficiency and cost of the manufacture.

The least costly dewatering method is drainage, and thereafter more expensive methods are used, including vacuum pressing, felt blanket blotting and pressing, evaporation and the like, and any combination of such methods. Because drainage is both the first dewatering method employed and the least expensive, improvements in the efficiency of drainage will decrease the amount of water required to be removed by other methods and improve the overall efficiency of dewatering, thereby reducing the cost thereof.

Another aspect of papermaking that is extremely important to the efficiency and cost of manufacture is the retention of furnish components on and within the fiber mat being formed during papermaking. A papermaking furnish contains particles that range in size from about the 2 to 3 millimeter size of cellulosic fibers to fillers measuring only a few microns. Within this range are cellulosic fines, mineral fillers (employed to increase opacity, brightness and other paper characteristics) and other small particles that generally, without the inclusion of one or more retention aids, would pass through the spaces (pores) between the cellulosic fibers in the fiber mat being formed.

Typical retention aids include high molecular weight cationic or anionic synthetic polymer flocculants, composed of one or more nonionic monomers and one or more cationic or anionic monomers. The flocculant functions by binding the particles into large agglomerates. The presence of such large agglomerates in the furnish increases retention and drainage. The agglomerates are filtered out of the water onto the fiber web, where unagglomerated particles would otherwise generally pass. The presence of agglomerates allows water to pass more easily from the furnish through the pores surrounding them.

Other points in the papermaking process where material savings are important include pulp washers or thickeners. These processes filter the pulp with the purpose of displacing unwanted soluble or colloidal materials out of the pulp suspension, or thickening the pulp for a subsequent processing step. Valuable filler or cellulose fines can be lost during either thickening or washing processes. The addition of treatment additives, such as coagulants or flocculants, can be beneficial to the efficiency of these processes.

In many papermaking furnishes, particularly furnishes containing recycled fibers, there may be anionic substances that compete with the target anionic materials to be flocculated. When the target filler and fiber surfaces must compete for polymer with anionic solutes or colloids (anionic "trash"), the flocculation efficiency is dramatically decreased because of the reduction in available cationic sites within the polymer. To circumvent this problem, one has traditionally complexed the detrimental anionic substances using a cationic coagulant. When the coagulant neutralizes the anionic charge on the high surface area of the detrimental anionic substances, the flocculant then remains "free" to aggregate the remaining anionic fiber and filler surfaces, which is the desired result. However, fluctuations in charge demand of the process water owing to varying levels of the soluble detrimental anionic substances means that the coagulant dose will have to change in order to achieve the same extent of neutralization. Although eliminating the variations in flocculation performance is critical to maintaining process control and consistent operation, maintaining a constant solution charge prior to flocculant addition can be quite difficult in practice. An alternative approach to charge neutralization using coagulant addition is adding a flocculant that, by design, is resistant to changes in anionic trash levels and concentrations of charged species in solution.

One example of such a flocculant is poly(acrylamide), which is a neutral, uncharged homopolymer. Another example is uncharged polymers composed of one or more zwitterionic monomers and one or more nonionic monomers, disclosed in published International Application Number PCT/US00/17841.

SUMMARY OF THE INVENTION

We have discovered that high molecular weight, charged polymers made from one or more nonionic monomers, one or more zwitterionic monomers, and one or more cationic or anionic monomers are unexpectedly effective for flocculating aqueous suspensions with high conductivity or containing high levels of soluble or colloidal anionic components.

Accordingly, in its principal aspect, this invention is directed to a high molecular weight water-soluble charged polymer comprising from about 50 to about 99.8 mole percent one or more nonionic monomers, from about 0.1 to 9.9 mole percent of one or more cationic or anionic monomers, and from about 0.1 to about 49.9 mole percent of one or more zwitterionic monomers of formula

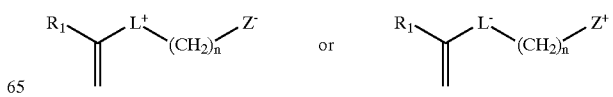

wherein

L$^+$ is a group of formula

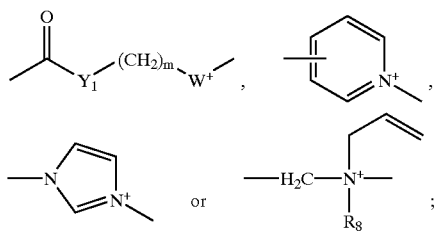

L$^-$ is a group of formula

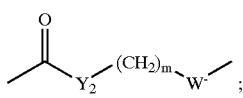

W$^+$ is —S$^+$R$_3$— or —N$^+$R$_2$R$_3$—;

W$^-$ is 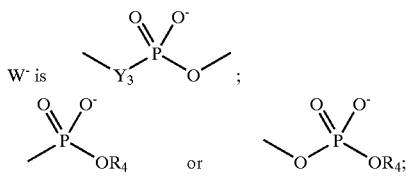

Z$^-$ is CO$_2^-$, SO$_3^-$,

Z$^+$ is —N$^+$R$_5$R$_6$R$_7$;

R$_1$ and R$_8$ are independently hydrogen or methyl;

R$_2$, R$_3$, R$_4$, R$_5$, R$_6$ and R$_7$ are independently selected from hydrogen and C$_1$–C$_4$ alkyl;

Y$_1$, Y$_2$, and Y$_3$ are independently selected from O or NR$_2$;

m is 2 or 3; and n is 1–5.

DETAILED DESCRIPTION OF THE INVENTION

"Alkyl" means a monovalent group derived from a straight or branched chain saturated hydrocarbon by the removal of a single hydrogen atom. Representative alkyl groups include methyl, ethyl, n- and iso-propyl, n-, sec-, iso- and tert-butyl, and the like. A preferred alkyl group is methyl.

"Reduced specific viscosity" (RSV) is an indication of polymer chain length and average molecular weight. The RSV is measured at a given polymer concentration and temperature and calculated as follows:

$$RSV = \frac{\left[\left(\frac{\eta}{\eta_o}\right) - 1\right]}{c}$$

wherein η=viscosity of polymer solution;

η$_o$=viscosity of solvent at the same temperature; and c=concentration of polymer in solution.

As used herein, the units of concentration "c" are (grams/100 ml or g/deciliter). Therefore, the units of RSV are dl/g. The RSV is measured at 30° C. The viscosities η and η$_o$ are measured using a Cannon-Ubbelohde semimicro dilution viscometer, size 75. The viscometer is mounted in a perfectly vertical position in a constant temperature bath adjusted to 30±0.02° C. The error inherent in the calculation of RSV is about 2 dl/g. Similar RSVs measured for two linear polymers of identical or very similar composition is one indication that the polymers have similar molecular weights, provided that the polymer samples are treated identically and that the RSVs are measured under identical conditions.

IV stands for intrinsic viscosity, which is RSV in the limit of infinite polymer dilution (i.e. the polymer concentration is equal to zero). The IV, as used herein, is obtained from the y-intercept of the plot of RSV versus polymer concentration in the range of 0.015–0.045 wt % polymer.

"Charged polymer" means a polymer having a net positive or negative charge. The charged polymers of this invention are composed of one or more zwitterionic monomers, one or more nonionic monomers and one or more cationic or anionic monomers. The charged polymers of this invention have a RSV of greater than 5 dl/g when measured at 450 ppm in 1M NaNO$_3$ as described herein. Preferred charged polymers have a RSV of greater than 15 dl/g. More preferred charged polymers have a RSV of greater than 25 dl/g.

"Monomer" means a polymerizable allylic, vinylic or acrylic compound. The monomer may be anionic, cationic or nonionic. Vinyl monomers are preferred, acrylic monomers are more preferred.

"Cationic monomer" means a monomer as defined herein which possesses a net positive charge. Representative cationic monomers include the quaternary or acid salts of dialkylaminoalkyl acrylates and methacrylates, the quaternary or acid salts of dialkylaminoalkylacrylamides and methacrylamides, N,N-diallyldialkyl ammonium halides, Mannich products, and the like. Alkyl groups are generally C$_{1-4}$ alkyl. Preferred cationic monomers include diallyldimethylammonium chloride (DADMAC), (3-acrylamidopropyl)trimethylammonium chloride (APTAC), (3-methacrylamido)propyltrimethylammonium chloride (MAPTAC), dimethylaminoethylacrylate methyl chloride quaternary salt (DMAEA.MCQ), dimethylaminoethylmethacrylate methyl chloride quaternary salt (DMAEM.MCQ) and dimethylaminoethylacrylate benzyl chloride quaternary salt (DMAEA.BCQ). Dimethylaminoethylacrylate methyl chloride quaternary salt is preferred.

"Anionic monomer" means a monomer as defined herein which possesses a net negative charge. Representative anionic monomers include metal salts of acrylic acid, methacrylic acid, or itaconic acid, 2-acrylamido-2-methyl propane sulfonate, sulfopropyl acrylate or methacrylate or other water-soluble forms of these or other polymerizable carboxylic or sulphonic acids, sulphomethylated acrylamide, allyl sulphonate, sodium vinyl sulphonate, and the like. Preferred anionic monomers include acrylic acid, methacrylic acid, 2-acrylamido-2-methyl propane sulfonic acid, monoacryloxyethyl phosphate and their sodium salts.

"Nonionic monomer" means a monomer as defined herein which is electrically neutral. Representative nonionic monomers include acrylamide, methacrylamide, N-methylacrylamide, N,N-dimethyl(meth)acrylamide, N-isopropyl(meth)acrylamide, N-(2-hydroxypropyl) methacrylamide, N-methylolacrylamide, N-vinylformamide, N-vinylacetamide, N-vinyl-N- methylacetamide, poly(ethylene glycol)(meth)acrylate, poly (ethylene glycol) monomethyl ether mono(meth)acrylate, N-vinyl-2-pyrrolidone, glycerol mono((meth)acrylate), 2-hydroxyethyl(meth)acrylate, vinyl methylsulfone, vinyl acetate, and the like. Preferred nonionic monomers include acrylamide and methacrylamide. Acrylamide is more preferred.

"Zwitterionic monomer" means a polymerizable molecule containing cationic and anionic (charged) functionality in equal proportions, so that the molecule is net neutral overall.

Representative Zwitterionic Monomers Include

N,N-dimethyl-N-acryloyloxyethyl-N-(3-sulfopropyl)-ammonium betaine, N,N-dimethyl-N-acrylamidopropyl-N-(2-carboxymethyl)-ammonium betaine, N,N-dimethyl-N-acrylamidopropyl-N-(3-sulfopropyl)-ammonium betaine, N,N-dimethyl-N-acrylamidopropyl-N-(2-carboxymethyl)-ammonium betaine, 2-(methylthio)ethyl methacryloyl-S-(sulfopropyl)-sulfonium betaine, 2-[(2-acryloylethyl) dimethylammonio]ethyl 2-methyl phosphate, 2-(acryloyloxyethyl)-2'-(trimethylammonium)ethyl phosphate, [(2-acryloylethyl)dimethylammonio] methyl phosphonic acid, 2-methacryloyloxyethyl phosphorylcholine (MPC), 2-[(3-acrylamidopropyl) dimethylammonio]ethyl 2'-isopropyl phosphate (AAPI), 1-vinyl-3-(3-sulfopropyl)imidazolium hydroxide, (2-acryloxyethyl) carboxymethyl methylsulfonium chloride, 1-(3-sulfopropyl)-2-vinylpyridinium betaine, N-(4-sulfobutyl)-N-methyl-N,N-diallylamine ammonium betaine (MDABS), N,N-diallyl-N-methyl-N-(2-sulfoethyl) ammonium betaine, and the like.

Preferred zwitterionic monomers include N,N-dimethyl-N-(3-methacrylamidopropyl)-N-(3-sulfopropyl) ammonium betaine, N,N-dimethyl-N-acryloyloxyethyl-N-(3-sulfopropyl)-ammonium betaine, N,N-dimethyl-N-acrylamidopropyl-N-(2-carboxymethyl)-ammonium betaine and N,N-dimethyl-N-methacryloyloxyethyl-N-(3-sulfopropyl)-ammonium betaine.

N,N-dimethyl-N-(3-methacrylamidopropyl)-N-(3-sulfopropyl) ammonium betaine is more preferred.

"Zwitterionic polymer" means a polymer composed from zwitterionic monomers and, possibly, other non-ionic monomer(s) as disclosed in published International Application Number PCT/US00/17841.

The zwitterionic monomers used for preparing the charged polymers of this invention are prepared as shown in Schemes 1 and 2. In Schemes 1 and 2, $R_1$, $R_2$, $R_3$, $R_4$, m and n are as defined herein, and p is 1 or 2.

Scheme 1

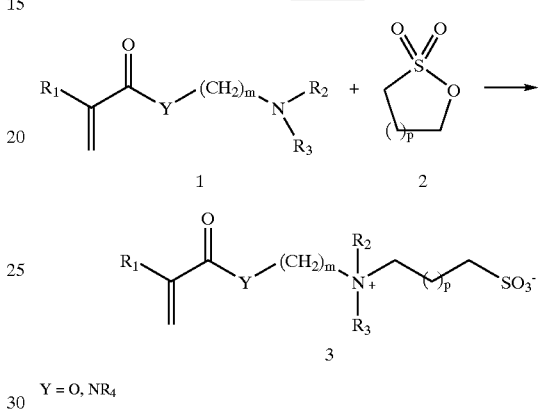

$Y = O, NR_4$

As shown in the foregoing Scheme 1, reaction of amine 1 with sultone 2, both available from Aldrich Chemical Co., Milwaukee, Wis., results in formation of the zwitterionic monomer 3. The reaction is conducted in a suitable organic solvent at a temperature of from about 25° C. to about 60° C. over about 6 to about 36 hours. Representative organic solvents include acetone, tetrahydrofuran, dioxane, ethyl acetate, and the like. The reaction is preferably conducted in acetone at about 30° C. to about 50° C. over 12–24 hours.

Scheme 2

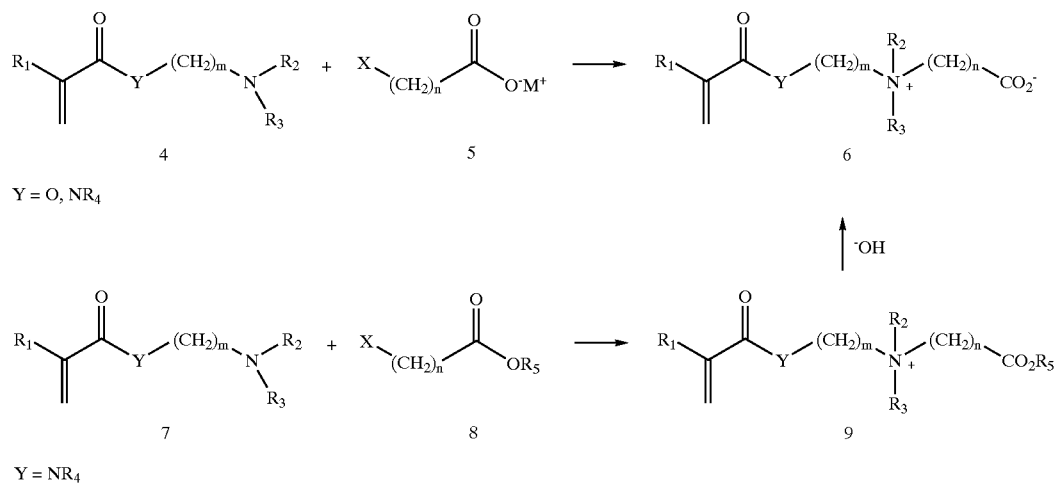

$Y = O, NR_4$ $Y = NR_4$

As shown in the foregoing Scheme 2, reaction of the amine 4 with the alkyl carboxylate 5 results in formation of the zwitterionic monomer 6. In Scheme 2, X represents any leaving group which may be displaced by the nucleophilic nitrogen atom of amines 4 and 7 under the conditions described herein. Representative leaving groups include halogen, tosylate, mesylate, and the like. A preferred leaving group is chloro. The reaction is conducted in water or in a mixture of water and a water-soluble organic solvent such that the acetate salt is soluble at a temperature of from about 25° C. to about 60° C. over about 6 to about 36 hours. Representative organic solvents include acetone, tetrahydrofuran, dioxane, and the like. The reaction is preferably conducted in water at about 30° C. to about 50° C. over 12–24 hours. Alternatively, as also shown in Scheme 2, the amine 7 may be allowed to react with an ester of the chloro- or bromomethylacetate, for example, in a suitable organic solvent to form a cationic intermediate, which can be isolated, purified, and subsequently hydrolyzed to the zwitterionic monomer under aqueous conditions.

The high molecular weight water-soluble charged polymers of this invention are composed of one or more zwitterionic monomers, one or more nonionic monomers, and one or more anionic or cationic monomers.

In a preferred aspect of this invention, the cationic monomers are selected from the group consisting of dimethylaminoethylacrylate methyl chloride quaternary salt, diallyldimethylammonium chloride, (3-acrylamidopropyl) trimethylammonium chloride, (3-methacrylamido) propyltrimethylammonium chloride, dimethylaminoethylmethacrylate methyl chloride quaternary salt and dimethylaminoethylacrylate benzylchloride quaternary salt.

In another preferred aspect, the anionic monomers are selected from the group consisting of acrylamidopropanesulfonic acid, acrylic acid, methacrylic acid, monoacryloxyethyl phosphate and their sodium salts.

In another preferred aspect, the high molecular weight water-soluble polymer comprises about 95 to about 99.8 mole percent of a nonionic monomer, about 4.9 to about 0.1 mole percent of a zwitterionic monomer and from about 4.9 to about 0.1 mole percent of a cationic monomer.

In another preferred aspect, the high molecular weight water-soluble polymer comprises about 95 to about 99.8 mole percent of a nonionic monomer, about 4.9 to about 0.1 mole percent of a zwitterionic monomer and from about 4.9 to about 0.1 mole percent of a anionic monomer.

In another preferred aspect, the nonionic monomers are selected from acrylamide, methacrylamide, N-methylacrylamide, N,N-dimethyl(meth)acrylamide, N-isopropyl(meth)acrylamide, N-(2-hydroxypropyl) methacrylamide, N-methylolacrylamide, N-vinylformamide, N-vinylacetamide, N-vinyl-N-methylacetamide, poly(ethylene glycol)(meth)acrylate, poly(ethylene glycol) monomethyl ether mono(meth)acrylate, N-vinyl-2-pyrrolidone, glycerol mono((meth)acrylate), 2-hydroxyethyl(meth)acrylate, vinyl methylsulfone and vinyl acetate.

In another preferred aspect, the nonionic monomers are selected from acrylamide and methacrylamide.

In another preferred aspect, the nonionic monomer is acrylamide.

In another preferred aspect, the nonionic monomer is acrylamide and the zwitterionic monomer is

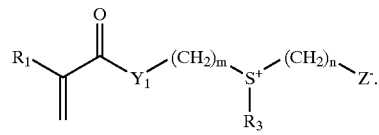

In another preferred aspect, the nonionic monomer is acrylamide and the zwitterionic monomer is

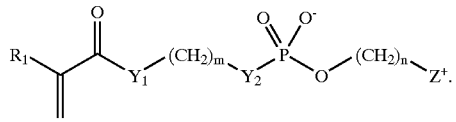

In another preferred aspect, the nonionic monomer is acrylamide and the zwitterionic monomer is

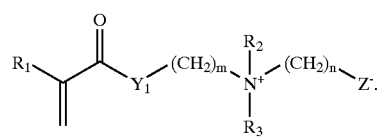

In another preferred aspect, the nonionic monomer is acrylamide and the zwitterionic monomer is selected from N,N-dimethyl-N-acryloyloxyethyl-N-(3-sulfopropyl)-ammonium betaine, N,N-dimethyl-N-acrylamidopropyl-N-(2-carboxymethyl)-ammonium betaine, N,N-dimethyl-N-methacryloyloxyethyl-N-(3-sulfopropyl)-ammonium betaine, N,N-dimethyl-N-methacrylamidopropyl-N-(3-sulfopropyl)-ammonium betaine, 2-(methylthio)ethyl methacryloyl-S-(sulfopropyl)-sulfonium betaine, 2-[(2-acryloylethyl)dimethylammonio]ethyl 2-methyl phosphate, 2-(acryloyloxyethyl)-2'-(trimethylammonium)ethyl phosphate and

[(2-acryloylethyl)dimethylammonio]methyl phosphonic acid.

In another preferred aspect, the nonionic monomer is acrylamide and the zwitterionic monomer is selected from N,N-dimethyl-N-acryloyloxyethyl-N-(3-sulfopropyl)-ammonium betaine, N,N-dimethyl-N-acrylamidopropyl-N-(2-carboxymethyl)-ammonium betaine, N,N-dimethyl-N-methacryloyloxyethyl-N-(3-sulfopropyl)-ammonium betaine and N,N-dimethyl-N-methacrylamidopropyl-N-(3-sulfopropyl)-ammonium betaine.

In another preferred aspect, the nonionic monomer is acrylamide, the zwitterionic monomer is N,N-dimethyl-N-methacrylamidopropyl-N-(3-sulfopropyl)-ammonium betaine and the cationic monomer is dimethylaminoethylacrylate methyl chloride quaternary salt.

In another preferred aspect, the nonionic monomer is acrylamide, the zwitterionic monomer is N,N-dimethyl-N- methacrylamidopropyl-N-(3-sulfopropyl)-ammonium betaine and the anionic monomer is acrylamidopropanesulfonic acid sodium salt.

As discussed herein, the preparation of high molecular weight polymers and copolymers of acrylamide as homogeneous solutions in water is difficult because of the extremely high viscosities encountered. High solution viscosities are detrimental for a number of reasons, one being the loss of the ability to mix the reaction mixture and another being the loss of the ability to effectively remove heat from the reactor. Fortunately, two general methods exist which do allow for the production of high molecular weight acrylamide containing polymers and copolymers. The first method, which consists of polymerizing monomer(s) within a dispersed phase, is typified by inverse emulsion polymerization or dispersion polymerization. In the case of an inverse emulsion polymerization, the dispersed phase is formed prior to the polymerization, while in the case of a dispersion polymerization, the "dispersed" phase containing the polymer forms during the polymerization. The second method for preparing high molecular weight polymers and copolymers of acrylamide consists of conducting a gel polymerization to produce the polymer product as a dry powder.

"Inverse emulsion polymer" and "latex polymer" mean an invertible water-in-oil polymer emulsion comprising a zwitterionic polymer according to this invention in the aqueous phase, a hydrocarbon oil for the oil phase, a water-in-oil emulsifying agent and, potentially, an inverting surfactant. Inverse emulsion polymers are hydrocarbon continuous with the water-soluble polymers dispersed as micron sized particles within the hydrocarbon matrix. The advantages of polymerizing water-soluble monomers as inverse emulsions include 1) low fluid viscosity can be maintained throughout the polymerization, permitting effective mixing and heat removal, 2) the products can be pumped, stored, and used easily since the products remain liquids, and 3) the polymer "actives" or "solids" level can be increased dramatically over simple solution polymers, which, for the high molecular weight flocculants, are limited to lower actives because of viscosity considerations. The inverse emulsion polymers are then "inverted" or activated for use by releasing the polymer from the particles using shear, dilution, and, generally, another surfactant, which may or may not be a component of the inverse emulsion.

Inverse emulsion polymers are prepared by dissolving the desired monomers in the aqueous phase, dissolving the emulsifying agent(s) in the oil phase, emulsifying the water phase in the oil phase to prepare a water-in-oil emulsion, in some cases, homogenizing the water-in-oil emulsion, polymerizing the monomers dissolved in the water phase of the water-in-oil emulsion to obtain the polymer as a water-in-oil emulsion. If so desired, a self-inverting surfactant can be added after the polymerization is complete in order to obtain the water-in-oil self-inverting emulsion.

The oil phase comprises any inert hydrophobic liquid. Preferred hydrophobic liquids include aliphatic and aromatic hydrocarbon liquids including benzene, xylene, toluene, paraffin oil, mineral spirits, kerosene, naphtha, and the like. A paraffinic oil is preferred.

Free radical yielding initiators such as benzoyl peroxide, lauroyl peroxide, 2,2'-azobis (isobutyronitrile) (AIBN), 2,2'-azobis(2,4-dimethylvaleronitrile) (AIVN), potassium persulfate and the like are useful in polymerizing vinyl and acrylic monomers. 2,2'-azobis(isobutyronitrile) (AIBN) and 2,2'-azobis(2,4-dimethylvaleronitrile) (AIVN) are preferred. The initiator is utilized in amounts ranging between about 0.002 and about 0.2 percent by weight of the monomers, depending upon the solubility of the initiator.

Water-in-oil emulsifying agents useful for preparing the latex polymers of this invention include sorbitan esters of fatty acids, ethoxylated sorbitan esters of fatty acids, and the like or mixtures thereof. Preferred emulsifying agents include sorbitan monooleate, polyoxyethylene sorbitan monostearate, and the like. Additional details on these agents may be found in McCutcheon's *Detergents and Emulsifiers*, North American Edition, 1980. Any inverting surfactant or inverting surfactant mixture described in the prior art may be used. Representative inverting surfactants include ethoxylated nonylphenol, ethoxylated linear alcohols, and the like. Preferred inverting surfactants are ethoxylated linear alcohols.

The polymer is prepared by polymerizing the appropriate monomers at from about 30° C. to about 85° C. over about 1 to about 24 hours, preferably at a temperature of from about 40° C. to about 70° C. over about 3 to about 6 hours.

"Dispersion" polymers mean a water-soluble polymer dispersed in an aqueous continuous phase containing one or more inorganic salts. Representative examples of dispersion polymerization of water-soluble polymers in an aqueous continuous phase can be found in U.S. Pat. Nos. 4,929,655, 5,006,590, 5,597,859 and 5,597,858 and in European Patent Nos. 657,478 and 630,909.

Dispersion polymers are prepared by combining water, one or more inorganic salts, one or more water-soluble monomers, any polymerization additives such as chelants, pH buffers or chain transfer agents, and a water-soluble stabilizer polymer. This mixture is charged to a reactor equipped with a mixer, a thermocouple, a nitrogen purging tube, and a water condenser. The monomer solution is mixed vigorously, heated to the desired temperature, and then a water-soluble initiator is added. The solution is purged with nitrogen whilst maintaining temperature and mixing for several hours. During the course of the reaction, a discontinuous phase containing the water-soluble polymer is formed. After this time, the products are cooled to room temperature, and any post-polymerization additives are charged to the reactor. Water continuous dispersions of water-soluble polymers are free flowing liquids with product viscosities generally 100–10,000 cP, as measured at low shear. The advantages of preparing water-soluble polymers as water continuous dispersions are similar to those already mentioned in association with the inverse emulsion polymers. The water continuous dispersion polymers have the further advantages that they contain no hydrocarbon oil or surfactants, and require no surfactant for "inversion" or activation.

A "gel" polymerization is defined as a process for producing polymers as dry powders. The preparation of high molecular weight water-soluble polymers as dry powders using a gel polymerization is generally performed as follows: an aqueous solution of water-soluble monomers, generally 20–60 percent concentration by weight, along with any polymerization or process additives such as chain transfer agents, chelants, pH buffers, or surfactants, is placed in an insulated reaction vessel equipped with a nitrogen purging tube. A polymerization initiator is added, the solution is purged with nitrogen, and the temperature of the reaction is allowed to rise uncontrolled. When the polymerized mass is cooled, the resultant gel is removed from the reactor, shredded, dried, and ground to the desired particle size.

The water-soluble charged polymers of this invention are useful as retention and drainage aids in the manufacture of paper and as a flocculant for removing suspended solids from white water in the papermaking process with particular importance for mechanical grades with high amounts of "anionic trash".

Mechanical pulping often produces paper furnishes which can be problematic to flocculate. In mechanical pulps, approximately 1–5% of the wood is transformed into soluble components contained in the process water. Due to inefficient washing of mechanical pulps (particularly bleached pulps), the dissolved and colloidal substances (DCS) are transferred to the paper machine where they can interfere with papermaking. The DCS is often anionically charged and is often referred to as anionic trash. The presence of DCS can dramatically effect the flocculation and drainage performance of additives described above which are designed to improve such processes. In highly closed systems, DCS may accumulate to high concentrations that are detrimental to optimum machine operation and/or product quality. Furthermore, fluctuations in bleaching levels can cause variations in DCS concentrations. DCS variability creates poor process control over the retention and drainage performance when additive effectiveness is DCS dependent. Thus, pulps with high and/or varying DCS levels or containing specific charged species detrimental to traditional flocculants require more specialized flocculants to maintain effective/efficient retention and drainage performance.

Accordingly, in another aspect, this invention is directed to a method of removing suspended solids and clarifying white water in the papermaking process comprising adding to the white water, pulp washers, or thickeners an effective flocculating amount of the high molecular weight water-soluble charged polymer of this invention.

In another aspect, this invention is directed to a method of increasing filler retention in a papermaking furnish comprising adding an effective flocculating amount of the high molecular weight water-soluble charged polymer of this invention to the filler slurry prior to addition to the papermaking furnish.

In another aspect, this invention is directed to a method for increasing retention and drainage in fibrous suspensions of pulp during processing of said pulp comprising adding to the pulp an effective amount of the high molecular weight water-soluble charged polymer of this invention.

The effective amount of the charged polymer depends on the characteristics of the particular papermaking furnish and can be readily determined by one of ordinary skill in the papermaking art. Typical dosages are from about 0.01 to about 6, preferably from about 0.1 to about 4 and more preferably from about 0.1 to about 2 pounds polymer actives/ton solids in the furnish.

The charged polymer of this invention may also be used in combination with a coagulant as part of a dual polymer treatment program. Preferred coagulants are water-soluble cationic polymers such as epichlorohydrin-dimethylamine or polydiallyldimethylammonium chloride, alum, polyaluminum chlorides or cationic starch.

In a preferred aspect, adding bentonite, synthetic clays, microparticles, or resin enhancers are added to the pulp.

"Microparticle" means highly charged materials that improve flocculation when used together with natural and synthetic macromolecules. The use of microparticles to improve the retention and drainage properties of a furnish is described in U.S. Pat. Nos. 4,753,710 and 4,913,775 incorporated herein by reference. Microparticles encompass a broad set of chemistries including polysilicate microgel, structured colloidal silicas, colloidal alumina, polymers including copolymers of acrylic acid and acrylamide and naphthalene sulfonate/formaldehyde condensate polymers, bentonite and mineral clays such as montmorillonite, saponite and smectite types and colloidal silica in its many forms including modified colloidal silicic acids such as those described in PCT/US98/19339.

Representative copolymers of acrylic acid and acrylamide useful as microparticles include Nalco® 8677 PLUS, available from ONDEO Nalco Company, Naperville, Ill., USA. Other copolymers of acrylic acid and acrylamide are described in U.S. Pat. No. 5,098,520, incorporated herein by reference.

"Bentonites" include any of the materials commercially referred to as bentonites or as bentonite-type clays, i.e., anionic swelling clays such as sepialite, attapulgite and montmorillonite. In addition, the bentonites described in U.S. Pat. No. 4,305,781 are suitable. A preferred bentonite is a hydrated suspension of powdered bentonite in water. Powdered bentonite is available as Nalbrite™, from ONDEO Nalco Company.

Representative dispersed silicas have an average particle size of from about 1 to about 100 nanometers (nm), preferably from about 2 to about 25 nm, and more preferably from about 2 to about 15 nm. This dispersed silica, may be in the form of colloidal, silicic acid, silica sols, fumed silica, agglomerated silicic acid, silica gels, precipitated silicas, and all materials described in Patent Cooperation Treaty Patent Application No. PCT/US98/19339, so long as the particle size or ultimate particle size is within the above ranges. Dispersed colloidal silica in water with a typical particle size of 4 nm is available as Nalco® 8671, from ONDEO Nalco Company. Another type of inorganic colloid used as a microparticle is a borosilicate in water; available as Nalco® 8692, from ONDEO Nalco Company. Other types of colloidal silica and modified colloidal silicas are commercially available from E.I. DuPont de Nemours and Co., Wilmington, Del. under the tradename Ludox®, from Akzo Nobel, Surte, Sweden (BMA or NP Series), from Vinings Industries Inc., Atlanta, Ga. and from Nissan Chemical Industries, Ltd., Tokyo, Japan.

Representative naphthalene sulfonate/formaldehyde condensate polymers include Nalco® 8678 from Nalco Chemical Company.

The amount of microparticle added is from about 0.05 to about 10, preferably from about 0.1 to about 9 and more preferably about 0.2 to about 6 pounds microparticle/ton.

"Pounds microparticle/ton" means pounds of actual microparticle per 2000 pounds of solids present in slurry.

The abbreviation for pounds of actual microparticle per 2000 pounds of solids present in slurry is "lbs microparticle/ton".

The microparticle is added to the papermaking furnish either before or after the structurally modified polymer is added to the furnish. The choice of whether to add the microparticle before or after the polymer can be made by a person of ordinary skill in the art based on the requirements and specifications of the papermaking furnish.

In a preferred aspect of this invention, the microparticle is bentonite.

The foregoing may be better understood by reference to the following examples which are presented for purposes of illustration and are not intended to limit the scope of this invention.

EXAMPLE 1

The preparation of a 1 mole % N,N-dimethyl-N-(3-methacrylamidopropyl)-N-(3-sulfopropyl) ammonium betaine/98.5 mole % acrylamide/0.50 mole % dimethylaminoethylacrylate methyl chloride quaternary salt water-in-oil emulsion polymer is described.

An oil phase is prepared by heating 260 g of a paraffinic oil, 12 g of a sorbitan monooleate (ICI Americas, Inc. Wilmington, Del.), and 9.2 g of a polyoxyethylene sorbitan tristearate (ICI Americas, Inc. Wilmington, Del.) until the surfactants dissolve.

An aqueous monomer phase is prepared by combining 540.7 g of acrylamide (47.6% solution), 92.8 g of deionized water, 10.93 g of N,N-dimethyl-N-(3-methacrylamidopropyl)-N-(3-sulfopropyl) ammonium betaine, 4.56 g of dimethylaminoethylacrylate methyl chloride quaternary salt (DMAEA.MCQ, 79.4% solution), 10 g of adipic acid, 60 g of sodium chloride, and 0.2 g of ethylenediaminetetraacetic acid, tetrasodium salt (Dow Chemical Co., Midland, Mich.).

The oil phase is charged to a 1.5 L reactor equipped with an agitator, a thermocouple, a water condenser and a nitrogen sparging tube. With vigorous stirring, the aqueous monomer phase is added to the oil phase to form a water-in-oil emulsion. This emulsion is heated to 44° C., and 0.200 g of AIBN (2,2'azobis(isobutyrylnitrile), E.I. DuPont Nemours & Co., Inc., Wilmington, Del.) and 0.025 g of AIVN ((2,2'azobis(2,4-dimethylvaleronitrile), E.I. DuPont Nemours & Co., Inc., Wilmington, Del.) is added. The polymerization is conducted at 44° C. for four hours, and then at 70° C. for one hour. The polymer product has a RSV of 24.5 dl/g (450 ppm in 1M $NaNO_3$).

EXAMPLE 2

The preparation of 1 mole % N,N-dimethyl-N-(3-methacrylamidopropyl)-N-(3-sulfopropyl) ammonium betaine/98.0 mole % acrylamide/1.0 mole % DMAEA.MCQ water-in-oil emulsion polymer is described.

An oil phase is prepared by heating 260 g of a paraffinic oil, 12 g of a sorbitan monooleate and 9.2 g of a polyoxyethylene sorbitan tristearate until the surfactants dissolve.

An aqueous monomer phase is prepared by combining 540.7 g of acrylamide (47.6% solution), 88.3 g of deionized water, 10.93 g of N,N-dimethyl-N-(3-methacrylamidopropyl)-N-(3-sulfopropyl) ammonium betaine, 9.13 g of DMAEA.MCQ (79.4% solution), 10 g of adipic acid, 60 g of sodium chloride, and 0.2 g of ethylenediaminetetraacetic acid, tetrasodium salt.

The oil phase is charged to a 1.5 L reactor equipped with an agitator, a thermocouple, a water condenser and a nitrogen sparging tube. With vigorous stirring, the aqueous monomer phase is added to the oil phase to form a water-in-oil emulsion. This emulsion is heated to 44° C., and 0.200 g of AIBN and 0.025 g of AIVN are added. The polymerization is conducted at 44° C. for four hours and then at 70° C. for one hour. The polymer product has a RSV of 23.0 dl/g (450 ppm in 1M $NaNO_3$).

EXAMPLE 3

The preparation of 1 mole % N,N-dimethyl-N-(3-methacrylamidopropyl)-N-(3-sulfopropyl) ammonium betaine/98.5 mole % acrylamide/0.50 mole % acrylamidopropanesulfonic acid sodium salt water-in-oil emulsion polymer is described.

An oil phase is prepared by heating 260 g of a paraffinic oil, 12 g of a sorbitan monooleate and 9.2 g of a polyoxyethylene sorbitan tristearate until the surfactants dissolve.

An aqueous monomer phase is prepared by combining 539.1 g of acrylamide (48.9% solution), 115.1 g of deionized water, 9.94 g of N,N-dimethyl-N-(3-methacrylamidopropyl)-N-(3-sulfopropyl) ammonium betaine, 4.65 g of acrylamidopropanesulfonic acid sodium salt (NaAMPS, 58.0% solution), 10 g of adipic acid, 40 g of sodium chloride, and 0.2 g of ethylenediaminetetraacetic acid, tetrasodium salt. The pH was adjusted to 4.1 with several drops of dilute sodium hydroxide.

The oil phase is charged to a 1.5 L reactor equipped with an agitator, a thermocouple, a water condenser and a nitrogen sparging tube. With vigorous stirring, the aqueous monomer phase is added to the oil phase to form a water-in-oil emulsion. This emulsion is heated to 44° C. and 0.200 g of AIBN and 0.025 g of AIVN are added. The polymerization is conducted at 44° C. for four hours and then at 70° C. for one hour. The polymer product has a RSV of 26.0 dl/g (450 ppm in 1M $NaNO_3$).

EXAMPLE 4

The preparation of 1 mole % N,N-dimethyl-N-(3-methacrylamidopropyl)-N-(3-sulfopropyl) ammonium betaine/98.0 mole % acrylamide/1.0 mole % acrylamidopropanesulfonic acid sodium salt water-in-oil emulsion polymer is described.

An oil phase is prepared by heating 260 g of a paraffinic oil, 12 g of a sorbitan monooleate and 9.2 g of a polyoxyethylene sorbitan tristearate until the surfactants dissolved.

An aqueous monomer phase is prepared by combining 534.7 g of acrylamide (49.3% solution), 119.5 g of deionized water, 9.94 g of N,N-dimethyl-N-(3-methacrylamidopropyl)-N-(3-sulfopropyl) ammonium betaine, 8.38 g of NaAMPS (58.0% solution), 10 g of adipic acid, 40 g of sodium chloride, and 0.2 g of ethylenediaminetetraacetic acid, tetrasodium salt. The pH is 4.04.

The oil phase is charged to a 1.5 L reactor equipped with an agitator, a thermocouple, a water condenser and a nitrogen sparging tube. With vigorous stirring, the aqueous monomer phase is added to the oil phase to form a water-in-oil emulsion. This emulsion is heated to 44° C. and 0.200 g of AIBN and 0.025 g of AIVN are added. The polymerization is conducted at 44° C. for four hours and then at 70° C. for one hour. The polymer product has a RSV of 25.5 dl/g (450 ppm in 1M $NaNO_3$).

The retention and drainage performance of representative polymers of this invention is measured using the protocols described below. The results are presented in Examples 5–9.

The polymers tested in Example 5–9 are shown in Table 1. In Table 1, Polymers A, D and E are representative terpolymers of this invention, Polymer B is a representative zwitterionic polymer as described in PCT/US00/17841 and Polymer C is a representative cationic copolymer flocculant. All polymers are available from ONDEO Nalco Company, Naperville, Ill.

TABLE 1

Tested Polymers

A  98.5 mole % acrylamide/1.0 mole % % N,N-dimethyl-N-(3-methacrylamidopropyl)-N-(3-sulfopropyl) ammonium betaine/0.5 mole % dimethylaminoethylacrylate methyl chloride quaternary salt terpolymer
B  99 mole % acrylamide/1.0 mole % % N,N-dimethyl-N-(3-methacrylamidopropyl)-N-(3-sulfopropyl) ammonium betaine water-in-oil emulsion copolymer
C  99 mole % acrylamide/1 mole % dimethylaminoethylacrylate methyl chloride quaternary salt water-in-oil emulsion copolymer, RSV = 23.5 dl/g
D  98 mole % acrylamide/1.0 mole % N,N-dimethyl-N-(3-methacrylamidopropyl)-N-(3-sulfopropyl) ammonium betaine/1 mole % 2-acrylamido-2-methyl-1-propanesulfonic acid sodium salt
E  98.5 mole % acrylamide/1.0 mole % N,N-dimethyl-N-(3-methacrylamidopropyl)-N-(3-sulfopropyl) ammonium betaine/0.5 mole % 2-acrylamido-2-methyl-1-propanesulfonic acid sodium salt Retention testing is conducted using a Dynamic Drainage Jar (DDJ) according to the procedure described in TAPPI Test Method T 261 cm-94, except that first pass retention (FPR) and first pass ash retention (FPAR) are measured instead of fines retention. First pass retention is defined as the fraction of the total solids in the furnish that does not pass the 125 P screen (76 µm openings) in the DDJ. Likewise, first pass ash retention is defined as the fraction of the total mineral fillers in the furnish that does not pass the 125 P screen. These retention measurements provide an indication of the amount of solids or filler that remain with the paper web during papermaking.

The ash content of the furnish is determined gravimetrically after oxidizing the sample for 30 minutes at 550° C. in a microwave oven. This causes the cellulose fibers and other wood components to convert to carbon dioxide, so that only the mineral fillers like clay remain.

The mixing conditions and polymer addition sequence for the retention test is shown in Table 2.

TABLE 2

| Time (s) | Action |
| --- | --- |
| 0 | Start mixer at 1,000 rpm and add sample furnish |
| 10 | Add microparticle or coagulant if desired |
| 20 | Add flocculant |

TABLE 2-continued

| Time (s) | Action |
| --- | --- |
| 30 | Open drain valve and start collecting the filtrate |
| 60 | Stop collecting the filtrate |

Drainage performance is evaluated by measuring vacuum break time using the VDT instrument. During VDT+ testing, the furnish is drained through an Ahlstrom 1278 filter paper (available from Ahlstrom Filtration, Inc, Mount Holly Springs, Pa.) under applied vacuum to form a pad. The time required to drain 200 ml of filtrate and the time required for removal of a continuous water phase from the pad (vacuum break time) are recorded. The vacuum pump is operated for one minute after the vacuum break and the vacuum value, referred to as the final pad vacuum, is recorded. The pad is removed from the VDT+ instrument, weighed, and dried in an oven at 105° C. The weight of the dry pad is used to determine the pad consistency.

The vacuum break time is a measure of the rate of water removal from the pulp in the forming section of the paper machine. If a polymer treatment increases the rate of water removal, it may be possible to add water to the headbox to reduce consistency, resulting in formation improvements, and improved vacuum and press dewatering. The final pad vacuum is inversely proportional to the air permeability of the pad. Increased permeability usually results from increased flocculation of the pulp and poor sheet formation. Good formation gives greater resistance to air channeling, resulting in a higher final pad vacuum. The pad consistency is a measure of the total extent of water removal. This is analogous to measuring solids or dryness at the papermachine couch roll. Higher pad consistencies will correlate to increased press dewatering and improved dryer section efficiency, resulting in increased production capacity.

Drainage is evaluated with the VDT+ using the mixing conditions and polymer addition sequence summarized in Table 3.

TABLE 3

Procedure for the evaluation of drainage with the Vacuum Drainage Tester (VDT+).

| Time (s) | Action |
| --- | --- |
| 0 | Turn on stirrer at 1,000 rpm and add alum if desired |
| 10 | Add microparticle or coagulant if desired |
| 20 | Add flocculant |
| 30 | Drain furnish |
| 1 minute after vacuum break | Measure final vacuum, stop |

Flocculation activity is measured by focused beam reflectance measurement (FBRM) using the Lasentec™ M500 (Lasentec, Redmond, Wash.). This is a scanning laser microscopy device that is used to measure the size distribution of solids in the furnish versus time during coagulation and flocculation. The technique is described in detail in Alfano et al., *Nordic Pulp Paper Res. J.*, vol. 13(2), p 59 (1998) and U.S. Pat. No. 4,871,251.

The number average chord length or mean chord length (MCL) as a function of time is used to characterize the flocculation response. The peak change in MCL caused by addition of the polymer treatments is used to compare their effectiveness. The peak change in MCL gives a representation of the speed and extent of flocculation under the shear conditions present.

The timing sequence used in the FBRM testing is shown in Table 4.

TABLE 4

Timing sequence used in the Lasentec ™ M500 FBRM testing.

| Time (s) | Action |
|---|---|
| 0 | Start mixer at 710 rpm |
| 18 | Add microparticle or coagulant if desired |
| 26 | Add flocculant |
| 110 | Stop experiment |

EXAMPLE 5

The drainage of 1.0% consistency newsprint furnish 1 (18% SGW (stone groundwood) and 82% TMP (thermomechanical pulp) pH 4.6 containing 2.5% kaolin filler) is determined using Ondeo Nalco's Vacuum Drainage Tester (VDT+). In the following data, the time to vacuum break for all polymers is compared to that found for the furnish with no added flocculant (blank). The percent improvement compared to the blank is tabulated in Table 5.

TABLE 5

Percent Drainage Improvement versus No Treatment for Furnish 1

| | Improvement in Drainage % | | |
|---|---|---|---|
| Polymer Dose kg/ton | A | B | C |
| 0.065 | 24.7 | 22.6 | 22.6 |
| 0.130 | 37.6 | 33.3 | 22.6 |
| 0.260 | 51.6 | 41.4 | 30.1 |

The first pass total and ash retentions are determined for newsprint furnish 1 using a Dynamic Drainage or Britt Jar as described above. The percent improvement in retention of total solids (FPR) or filler fines (FPAR) versus the blank is reported in Table 6 for polymers A, B and C.

TABLE 6

Comparison of Improved Retention versus No Treatment for Newsprint Furnish #1

| | Improvement in Retention % | | |
|---|---|---|---|
| Polymer Dosed at 0.26 kg/ton | A | B | C |
| FPR | 24.8 | 24.8 | 14.5 |
| FPAR | 43.3 | 43.3 | 30.4 |

As shown in Tables 5 and 6, retention performance of a zwitterionic polymer according to PCT/US00/17841 (Polymer B) and a representative cationic terpolymer of this invention (Polymer A) are equivalent but the drainage performance of Polymer A is superior. The performance of Polymer A is clearly superior to a representative cationic copolymer flocculant.

EXAMPLE 6

The drainage of 1.0% consistency newsprint furnish 2 (14% SGW (stone groundwood), 68% TMP (thermomechanical pulp) and 14% Kraft, pH 4.9 containing 3.9% kaolin filler) is measured as described in Example 5. The results for representative polymers are shown in Table 7.

TABLE 7

Percent Drainage Improvement versus No Treatment for Furnish 2

| | Improvement in Drainage % | | |
|---|---|---|---|
| Polymer Dose kg/ton | A | B | C |
| 0.25 | 29.7 | 5.4 | 8.1 |
| 0.50 | 20.3 | 5.4 | 20.3 |

In this same furnish, the flocculation response of polymers A, B, and C are determined by focused beam reflectance measurement (FBRM) as described above. In Table 8, the relative improvement in flocculation versus a representative zwitterionic polymer (Polymer B) is tabulated.

TABLE 8

Comparison of Relative Flocculation Response for Newsprint Furnish #2 Relative Improvement versus the Zwitterionic Polymer B

| | Relative Flocculation Response | | |
|---|---|---|---|
| Polymer Dose kg/ton | A | B | C |
| 0.125 | 1.00 | 1.00 | 1.00 |
| 0.250 | 1.48 | 1.00 | 1.00 |
| 0.500 | 1.39 | 1.00 | 1.00 |
| 0.750 | 1.57 | 1.00 | — |

As shown in Tables 7 and 8, not only are the drainage values superior for a representative cationic terpolymer of this invention, but the relative flocculation versus a representative zwitterionic polymer (Polymer B) and cationic copolymer flocculant (Polymer C) are improved by as much as 57%. This emphasizes the unique difference between the terpolymer of this invention and the two copolymers to which it is compared.

EXAMPLE 7

The drainage of a 1.0% consistency newsprint furnish 3 (60% PGW (Pressure Groundwood), 10% Kraft and 30% broke containing 3.0% filler) is measured as described in Example 5. The percent improvement compared to the blank is tabulated in Table 9.

TABLE 9

Percent Drainage Improvement versus No Treatment for Furnish 3

| | Improvement in Drainage % | | |
|---|---|---|---|
| Polymer Dose kg/ton | A | B | C |
| 0.026 | 14.6 | 10 | 10.0 |
| 0.078 | 12.4 | −3.3 | 12.4 |
| 0.260 | 39.3 | 16.9 | 28.1 |
| 0.520 | 41.5 | 16.9 | |

The total and ash retentions are determined for newsprint furnish 3 using a Dynamic Drainage or Britt Jar as described above. The percent improvement in retention of total solids (FPR) or filler fines (FPAR) versus the blank is reported in Table 10 for polymers A, B and C.

TABLE 10

Comparison of Improved Retention versus No Treatment for Newsprint Furnish 3

| Polymer Dose kg/ton | | Retention % | | |
|---|---|---|---|---|
| | | A | B | C |
| 0 | FPR | 70.4 | 70.4 | 70.4 |
| 0 | FPAR | 6.5 | 6.5 | 6.5 |
| 0.106 | FPR | 74.9 | 74.5 | 72.9 |
| 0.106 | FPAR | 34.2 | 28.0 | 25.2 |
| 0.212 | FPR | 75.8 | 73.8 | 74.0 |
| 0.212 | FPAR | 30.3 | 22.6 | 30.3 |

As shown in Tables 9 and 10, the drainage and retention performance of a representative cationic terpolymer of this invention is superior to a representative zwitterionic polymer (Polymer B) and cationic copolymer flocculant (Polymer C).

EXAMPLE 8

The flocculation responses of representative anionic terpolymers of this invention (Polymers D and E) are determined by focused beam reflectance measurement (FBRM) as described above for newsprint furnish 4 (70% recycled deinked pulp (DIP) and 30% peroxide bleached TMP with 29% kaolin filler). The relative improvement in flocculation versus a representative zwitterionic polymer (Polymer B) is tabulated in Table 11.

TABLE 11

Comparison of Relative Flocculation Response for Representative Anionic Terpolymers versus Zwitterionic Polymer B in Newsprint Furnish 4

| Polymer Dose lb/ton | Relative Flocculation Response | | | |
|---|---|---|---|---|
| | D | E | A | B |
| 0.52 | 0.87 | 1.22 | 0.97 | 1.0 |

As shown in Table 11, representative anionic terpolymers of this invention provide retention performance similar to the zwitterionic polymers according to PCT/US00/17841.

EXAMPLE 9

The flocculation responses of representative anionic terpolymers of this invention (Polymers D and E) are determined by focused beam reflectance measurement (FBRM) as described above for newsprint furnish 4.

In this Example, 5 lb/ton bentonite is added prior to addition of the flocculant. The relative improvement in retention versus a representative zwitterionic polymer (Polymer B) is tabulated in Table 12.

TABLE 12

The Effect of 5 lb/ton Bentonite on Flocculation Response for Newsprint Furnish 4, Percent Improvement versus Flocculant Alone

| Polymer Dose lb/ton | % Improvement over Flocculant Alone | | | |
|---|---|---|---|---|
| | D | E | A | B |
| 0.52 | 69.4 | 13.7 | 18.5 | 16.3 |

As shown in Table 12, the anionic terpolymer E of this invention provides a flocculation response similar to the zwitterionic polymer B according to PCT/US00/17841 when used with 5 lb/ton bentonite. An unexpectedly large enhancement in flocculation response is obtained when the anionic terpolymer D is used with high surface area bentonite clay.

Although this invention has been described in detail for the purpose of illustration, it is to be understood that such detail is solely for that purpose and that numerous modifications, alterations and changes can be made therein by those skilled in the art without departing from the spirit and scope of the invention except as it may be limited by the claims. All changes which come within the meaning and range of equivalency of the claims are to be embraced within their scope.

What is claimed is:

1. A high molecular weight water-soluble charged polymer comprising from about 50 to about 99.8 mole percent one or more nonionic monomers, from about 0.1 to 9.9 mole percent of one or more cationic or anionic monomers, and from about 0.1 to about 49.9 mole percent of one or more zwitterionic monomers of formula

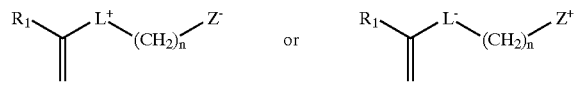

wherein $L^+$ is a group of formula

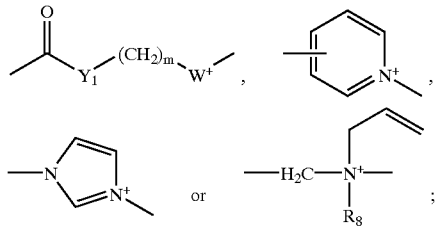

$L^-$ is a group of formula

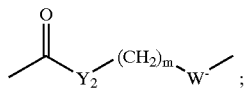

$W^+$ is $—S^+R_3—$ or $—N^+R_2R_3—$;

W⁻ is 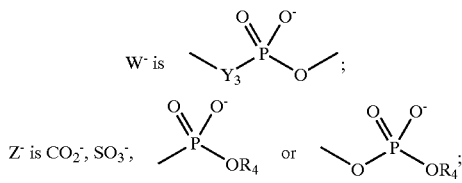

Z⁻ is $CO_2^-$, $SO_3^-$, 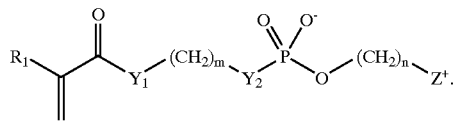

$Z^+$ is $-N^+R_5R_6R_7$;

$R_1$ and $R_8$ are independently hydrogen or methyl;

$R_2, R_3, R_4, R_5, R_6$ and $R_7$ are independently selected from hydrogen and $C_1-C_4$ alkyl;

$Y_1, Y_2$, and $Y_3$ are independently selected from O or $NR_2$;

m is 2 or 3; and n is 1–5.

2. The polymer of claim 1 wherein the cationic monomers are selected from the group consisting of dimethylaminoethylacrylate methyl chloride quaternary salt, diallyldimethylammonium chloride, (3-acrylamidopropyl)trimethylammonium chloride, (3-methacrylamido)propyltrimethylammonium chloride, dimethylaminoethylmethacrylate methyl chloride quaternary salt and dimethylaminoethylacrylate benzylchloride quaternary salt.

3. The polymer of claim 1 wherein the anionic monomers are selected from the group consisting of acrylamidopropanesulfonic acid, acrylic acid, methacrylic acid, monoacryloxyethyl phosphate and their sodium salts.

4. The high molecular weight water-soluble polymer of claim 1 comprising about 95 to about 99.8 mole percent of a nonionic monomer, about 4.9 to about 0.1 mole percent of a zwitterionic monomer and from about 4.9 to about 0.1 mole percent of a cationic monomer.

5. The high molecular weight water-soluble polymer of claim 1 comprising about 95 to about 99.8 mole percent of a nonionic monomer, about 4.9 to about 0.1 mole percent of a zwitterionic monomer and from about 4.9 to about 0.1 mole percent of an anionic monomer.

6. The high molecular weight water-soluble polymer of claim 1 wherein the nonionic monomers are selected from acrylamide, methacrylamide, N-methylacrylamide, N,N-dimethyl(meth)acrylamide, N-isopropyl(meth)acrylamide, N-(2-hydroxypropyl)methacrylamide, N-methylolacrylamide, N-vinylformamide, N-vinylacetamide, N-vinyl-N-methylacetamide, poly(ethylene glycol)(meth)acrylate, poly(ethylene glycol) monomethyl ether mono(meth)acryate, N-vinyl-2-pyrrolidone, glycerol mono((meth)acrylate), 2-hydroxyethyl (meth)acrylate, vinyl methylsulfone and vinyl acetate.

7. The high molecular weight water-soluble polymer of claim 1 wherein the nonionic monomers are selected from acrylamide and methacrylamide.

8. The high molecular weight water-soluble polymer of claim 1 wherein the nonionic monomer is acrylamide.

9. The high molecular weight water-soluble polymer of claim 1 wherein the nonionic monomer is acrylamide and the zwitterionic monomer is

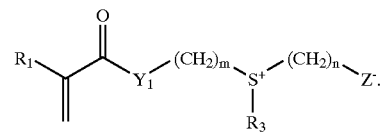

10. The high molecular weight water-soluble polymer of claim 1 wherein the nonionic monomer is acrylamide and the zwitterionic monomer is

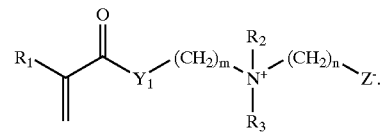

11. The high molecular weight water-soluble polymer of claim 1 wherein the nonionic monomer is acrylamide and the zwitterionic monomer is 12. The high molecular weight water-soluble polymer of claim 1 wherein the nonionic monomer is acrylamide and the zwitterionic monomer is selected from N,N-dimethyl-N-acryloyloxyethyl-N-(3-sulfopropyl)-ammonium betaine, N,N-dimethyl-N-acrylamidopropyl-N-(2-carboxymethyl)-ammonium betaine, N,N-dimethyl-N-methacryloyloxyethyl-N-(3-sulfopropyl)-ammonium betaine, N,N-dimethyl-N-methacrylamidopropyl-N-(3-sulfopropyl)-ammonium betaine, 2-(methylthio)ethyl methacryloyl-S-(sulfopropyl)-sulfonium betaine, 2-[(2-acryloylethyl)dimethylammonio]ethyl 2-methyl phosphate, 2-(acryloyloxyethyl)-2'-(trimethylammonium)ethyl phosphate and

[(2-acryloylethyl)dimethylammonio]methyl phosphonic acid.

13. The high molecular weight water-soluble polymer of claim 1 wherein the nonionic monomer is acrylamide and the zwitterionic monomer is selected from N,N-dimethyl-N-acryloyloxyethyl-N-(3-sulfopropyl)-ammonium betaine, N,N-dimethyl-N-acrylamidopropyl-N-(2-carboxymethyl)-ammonium betaine, N,N-dimethyl-N-methacryloyloxyethyl-N-(3-sulfopropyl)-ammonium betaine and N,N-dimethyl-N-methacrylamidopropyl-N-(3-sulfopropyl)-ammonium betaine.

14. The high molecular weight water-soluble polymer of claim 1 wherein the nonionic monomer is acrylamide, the zwitterionic monomer is N,N,-dimethyl-N-methacrylamidopropyl-N-(3-sulfopropyl)-ammonium betaine and the cationic monomer is dimethylaminoethylacrylate methyl chloride quaternary salt.

15. The high molecular weight water-soluble polymer of claim 1 wherein the nonionic monomer is acrylamide, the zwitterionic monomer is N,N-dimethyl-N-methacrylamidopropyl-N-(3-sulfopropyl)-ammonium betaine and the anionic monomer is 2-acrylamido-2-methyl propane sulfonic acid sodium salt.

16. A method for increasing retention and drainage in fibrous suspensions of pulp during processing of said pulp comprising adding to the pulp an effective flocculating amount of the high molecular weight water-soluble polymer of claim 1.

17. The method of claim 16 further comprising adding bentonite, synthetic clays, microparticles, or resin enhancers to the pulp.

18. The method of claim 16 further comprising adding coagulant to the pulp.

19. A method of removing suspended solids and clarifying white water in the papermaking process comprising adding to the white water, pulp washers, or thickeners an effective flocculating amount of the high molecular weight water-soluble polymer of claim 1.

20. A method of increasing filler retention in a papermaking furnish comprising adding an effective flocculating amount of the high molecular weight water-soluble polymer of claim 1 to the filler slurry prior to addition to the papermaking furnish.

* * * * *